H. C. PARKER.
GAS ANALYZING APPARATUS AND PROCESS.
APPLICATION FILED APR. 5, 1912.
1,057,767.
Patented Apr. 1, 1913.
2 SHEETS—SHEET 1.
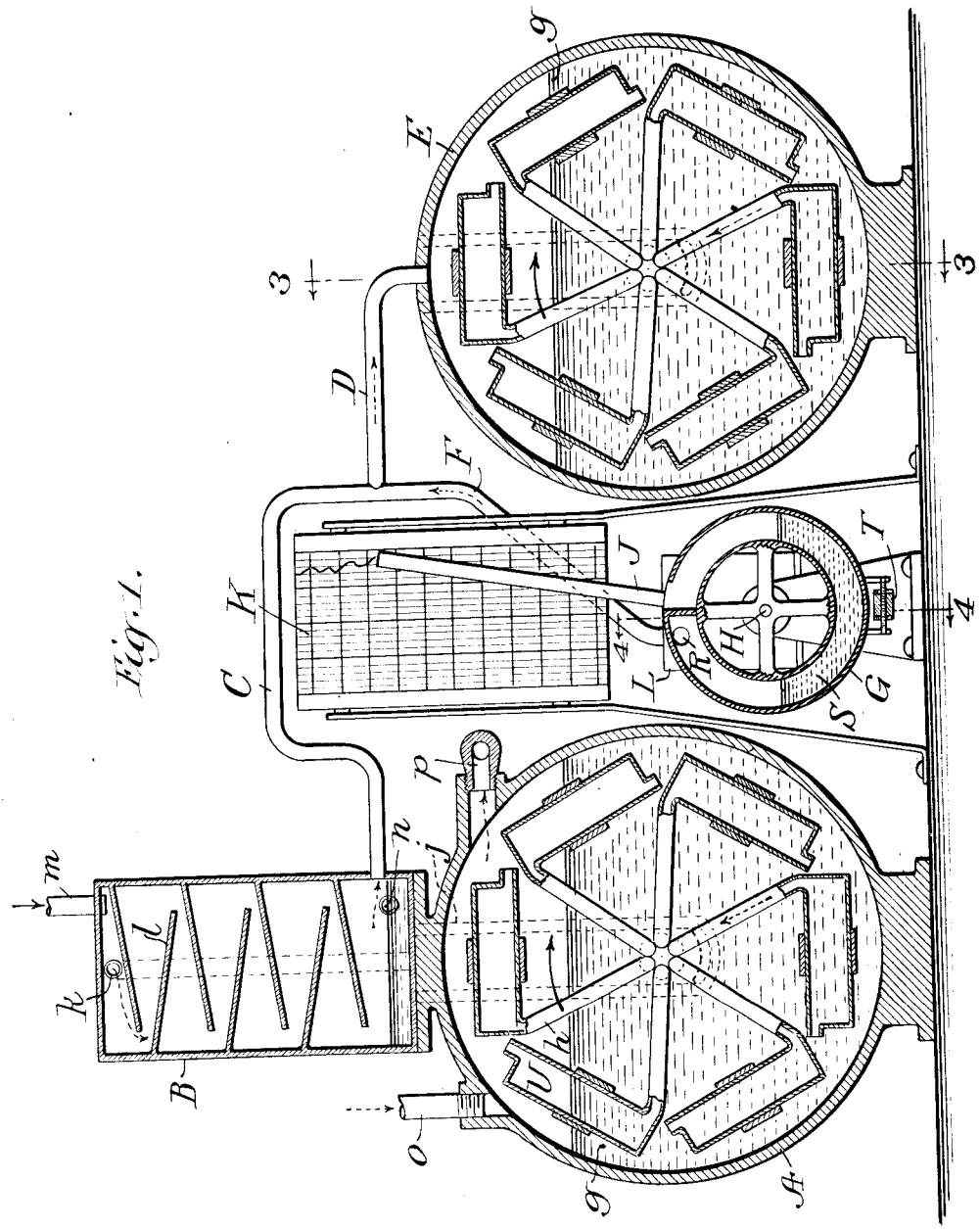
WITNESSES
Lulu Stubenroll
William K. Beewagen
Henry C. Parker INVENTOR
BY
D. Anthony Usina ATTORNEY

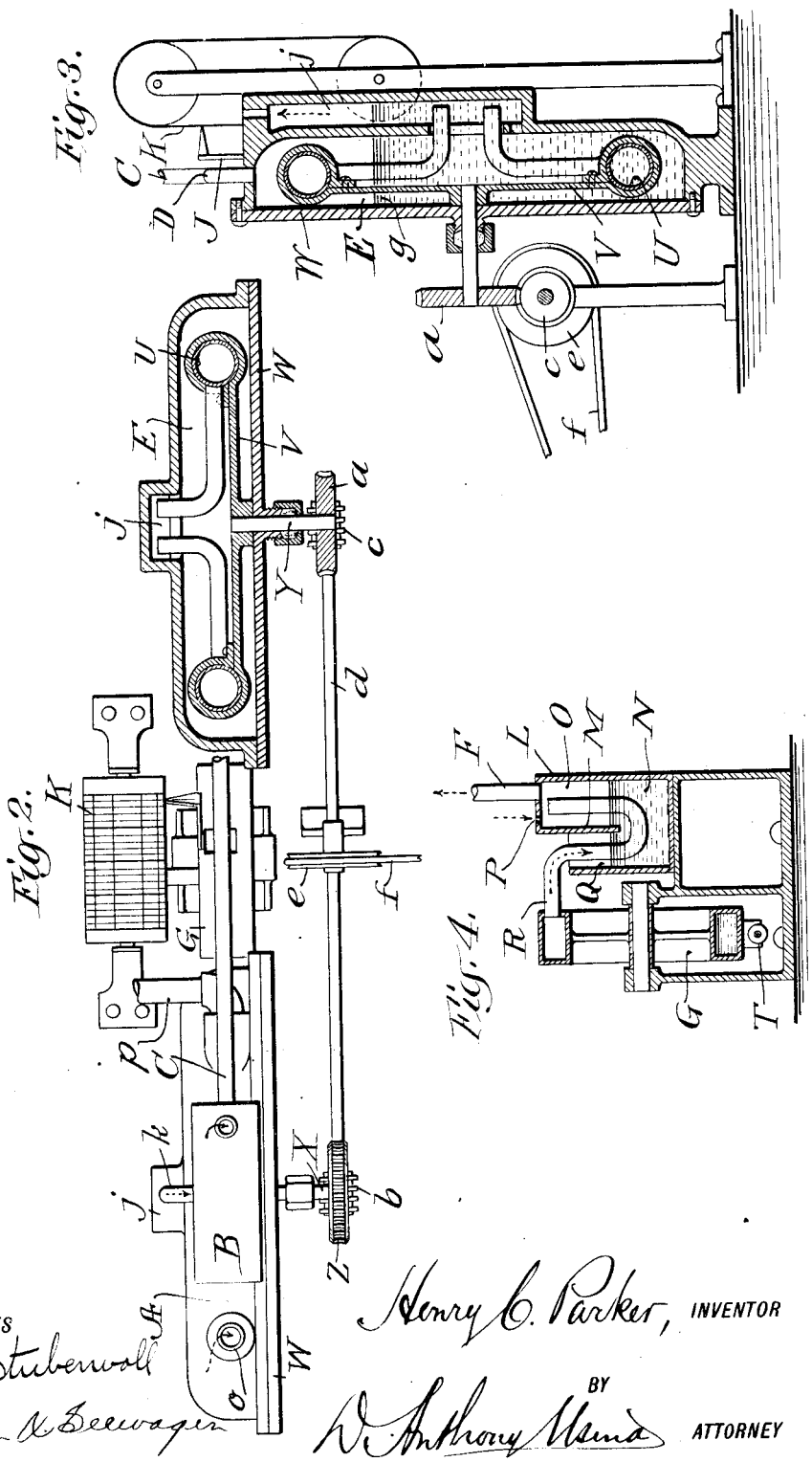
H. C. PARKER.
GAS ANALYZING APPARATUS AND PROCESS.
APPLICATION FILED APR. 5, 1912.
1,057,767.
Patented Apr. 1, 1913.

UNITED STATES PATENT OFFICE.

HENRY C. PARKER, OF HOLYOKE, MASSACHUSETTS.

GAS-ANALYZING APPARATUS AND PROCESS.

1,057,767. Specification of Letters Patent. Patented Apr. 1, 1913.

Application filed April 5, 1912. Serial No. 688,654.

*To all whom it may concern:*

Be it known that I, HENRY C. PARKER, a citizen of the United States, and a resident of Holyoke, Massachusetts, have invented certain new and useful Improvements in Gas-Analyzing Apparatus and Processes, of which the following is a specification.

This invention aims to provide for analyzing gases of various sorts. By way of example, the invention is illustrated as applied to the analysis of flue gases to automatically determine and record the percentage of carbon dioxid therein. This is accomplished by extracting the carbon dioxid (or other constituent or constituents to be determined) sucking the residual gas through a pipe and measuring the differences in pressure between the atmosphere and the interior of the pipe. This difference in pressure is used to measure a quantity of air which is admitted to the residual gas and which has a known relation to the volume of the extracted constitutent. Thus the volume or extent of the extracted constituent is measured indirectly by the volume of air which is admitted, this in turn being measured by the difference in pressure stated.

An apparatus and process embodying the invention will be described more fully in connection with the accompanying drawings illustrating a suitable form of the apparatus, and the features of novelty expressed in the claims hereinafter.

Figure 1 is a longitudinal section, partly in elevation of the entire apparatus; Fig. 2 is a plan of the same, showing one of the pumps in horizontal section; Figs. 3 and 4 are cross-sections respectively on the lines 3—3 and 4—4 of Fig. 1.

Referring now to the embodiment of the invention illustrated, a constant-flow pump A is interposed in a current of the gas to be analyzed flowing through a sampling tube and takes a measured volume (per unit of time) of such gas and discharges it into the upper end of an extracting vessel such as the absorption tank B, in which the carbon dioxid is absorbed. The residual gas from the absorption tank B passes through pipes C and D to a second constant-flow pump E which sucks the residual gas from the pipe C, and discharges it into the waste pipe. A pipe F communicates with the atmosphere as hereinafter explained so as to admit a quantity of air to the pipe D and pump E. The volume of residual gas coming through the pipe C plus the volume of air coming through the pipe F make up the constant volume to which the second pump E is gaged. Supposing the volume passing through the pump E to be the same as that passing through the pump A, then the volume of air sucked through the pipe F would be equal to the constituent of the gas extracted in the tank B. It is only necessary to measure this volume of air and we have immediately the volume of the extracted constituent. If, however, the volume for which the pump E is gaged be greater or less than the volume for which the pump A is gaged, there will be a constant difference between these two volumes and it is only necessary to add or subtract this constant difference to or from the volume of air in order to get the volume of constituent extracted. In any case, the difference between the flow through the two pumps being known, a known relation is established between the volume of the constituent extracted and the volume of air introduced; and by measuring the volume of air the volume of the constituent will be known. The volume of air is continuously measured and recorded by means of a sort of U-tube G which is in communication with the air pipe F and is pivoted at H and which carries a pen arm J, the pen of which is in contact with a sheet of record paper K driven by clock work or in any other usual or suitable manner. The pipe F is connected at its lower end to a box L provided with a depending vertical partition M for forming a seal by means of water or other liquid N between a chamber O which communicates with the atmosphere only through a small throttling orifice P, and a chamber Q which is freely opened at its upper end to the atmosphere. The U-tube G has one end open as shown in Fig. 1. The other end, as shown in Fig. 4, is connected to a pipe R which passes down through the space Q and through the liquid seal N and up into the sealed chamber O. As there is a practically continuous suction through the pipe F there is also a practically continuous flow of air through the orifice P into the chamber O. The suction in the pipe F and consequently in the chamber O increases and diminishes from time to time as the quantity of residual gas flowing through the pipe C decreases or increases. Similarly the pressure communicated through the tube R to one end of the column of liquid S in the U-tube increases or diminishes and the body of liquid, which may be mercury, for example, is forced toward one side or the other of the center and causes the tube to tilt to the right or to the left, carrying the pen arm J with it and making the record accordingly. The difference between the pressures on opposite ends of the column of liquid S is the difference between atmospheric pressure and the pressure within the chamber O. This difference in pressure is a measure of the volume of air flowing through the orifice P, which in turn bears a known relation to the volume of the constituent gas extracted in the tank B. A counterweight T is mounted on the bottom of the U-tube upon a horizontal threaded rod so that it can be adjusted to one side or the other so as to set the tube and pen arm in the desired position of adjustment for a given pressure. The volume of the sealing liquid in this circular tube may vary to a certain extent in filling it or through evaporation without altering the adjustment of the pen. The sealed connection of the tube to the chamber in which are the pressures to be measured opposes a minimum of resistance to the swinging of the U-tube and is of great importance to the sensitiveness of the device where slight differences in the pressure are to be measured. For example, in the ordinary analysis of flue gases for carbon dioxid with this apparatus the variations in pressure may be within a maximum of half an inch of water column.

Various types of pumps may be employed to secure the constant flow desired. The pumps illustrated comprise a series of buckets U mounted on a disk V (Figs. 2 and 3) in casings W. The pumps A and E are provided respectively with shafts X and Y extending through the casing and carrying at their outer ends worm gears Z and a driven by means of worms b, c on a common shaft d which is driven at a constant rate from any suitable source of power by means of a pulley e and belt f which may, for example, be driven by an electric motor so as to turn the pumps at the rate of say two revolutions per minute. The pump casings are filled with liquid g, oil or water, for example, to a level somewhat above the center, leaving a suitable gas space above for the buckets to pass through and take up gas. Each bucket is open at one end and carries a tube h passing from its other end to the center of the casing where it is bent to enter a supplementary chamber j communicating with the water space in the main casing, but cut off by the water from communication with the gas space thereof. As the buckets rotate, a bucket above the surface of the liquid will be filled with gas. As its open end enters the liquid a certain volume of gas is sealed in the bucket. As the bucket moves down the liquid forces this measured volume of gas upward through the tube h and the gas bubbles up into the supplementary chamber j. All the gas passes out of the bucket and tube before the bucket reaches its lower position. The liquid replaces the gas therein, but as the bucket rises the liquid in turn runs out and the bucket is emptied and ready to measure out another volume of gas. Six such buckets are shown in each of the pumps and this will provide a flow which is nearly enough continuous for most operations. From the supplementary chamber j of the first pump A the gas passes upward through a tube k to the upper end of the absorption tank B. This is an air tight vessel containing baffle plates l. A continuous stream of a suitable liquid for absorbing the carbon dioxid is admitted through a tube m, runs down over the baffles and is discharged through a tube n at the lower end into a tank. A strong solution of caustic potash may be used as the absorption liquid. This can be returned to the pipe m and circulated a number of times before it becomes too weak to absorb the carbon dioxid; after which it may be drawn off and a fresh supply provided. The circuit for this liquid is so arranged as not to admit any air to the tank B. The supplementary chamber j of the second pump E discharges directly into a waste pipe (not shown).

In connecting the apparatus up to a flue, an open ended or perforated pipe called a sampling tube is placed in the path of the flue gases near the damper. A pipe line is laid from this sampling tube to the admission pipe o of the first pump A of the analyzing apparatus. The gas, therefore, flows into the pump A and through it in a continuous stream, the excess passing out by the pipe p connecting with the main suction fan or flue.

What I claim is:—

1. A gas analyzing apparatus including in combination a circuit for the passage of gas, means for maintaining a constant inflow of gas at one end and a constant outflow at the other end of said circuit, means for removing from said circuit a constituent of said gas which is to be measured, means for introducing air into said circuit in sufficient quantity to supply the constant outflow, and means for measuring said quantity of air.

2. A gas analyzing apparatus including in combination a circuit for the passage of gas, means for maintaining a constant inflow of gas at one end and a constant outflow at the other end of said circuit, means for removing from said circuit a constituent of said gas which is to be measured, means for introducing air into said circuit through a small orifice in sufficient quantity to supply the constant outflow, and means for measuring the drop in pressure between the atmospheric side and the inner side of said orifice.

3. A gas analyzing apparatus including in combination a constant-flow pump having an inlet communicating with the gas to be analyzed, an absorption tank into which said pump discharges, means in said tank for absorbing a constituent of said gas which is to be measured, a second constant-flow pump having its inlet in communication with said tank for pumping the residual gas out of said tank and driven synchronously with the first pump, said inlet of the second pump being also in communication with the atmosphere so as to continuously pump a quantity of air proportional to the quantity of the constituent absorbed in said tank, and means for measuring said quantity of air.

4. A gas analyzing apparatus including in combination a constant-flow pump having an inlet communicating with the gas to be analyzed, an absorption tank into which said pump discharges, means in said tank for absorbing a constituent of said gas which is to be measured, a second constant-flow pump having its inlet in communication with said tank for pumping the residual gas out of said tank and driven synchronously with the first pump, said inlet of the second pump being also in communication through a small orifice with the atmosphere so as to continuously pump a quantity of air proportional to the quantity of the constituent absorbed in said tank, and means for recording the drop in pressure between the atmospheric side and the inner side of said orifice.

5. A gas analyzing apparatus including in combination means for introducing measured quantities of the gas at a regular rate into a receptacle and passing the gas in a continuous stream through said receptacle, means for extracting a constituent of the gas passed through said receptacle, means for introducing air sufficient to make, with the residual gas, a constant quantity, and means for measuring the air thus introduced.

6. A gas analyzing apparatus including in combination means for taking a measured portion of the gas at a regular rate from a passing current of the gas, means for extracting a constituent continuously from such measured portion, means for introducing air sufficient to make, with such measured portion from which a constituent has been extracted, a constant quantity, and means for measuring the air thus introduced.

7. A gas analyzing apparatus including in combination means for measuring the gas, means for extracting a constituent from the gas, means for admitting to the residual gas a quantity of air having a known relation to the volume of the constituent extracted, and means for measuring the volume of such air.

8. A gas analyzing apparatus including in combination means for measuring the gas means for extracting a constituent from the gas, means for drawing air through an orifice at a rate bearing a known relation to the volume of the constituent extracted, and means for utilizing the drop in pressure between the opposite sides of the orifice to measure such volume.

9. The method of analyzing a gas which consists in measuring the volume of the gas extracting a constituent from the gas, admitting to the residual gas a quantity of air having a known relation to the constituent extracted, and measuring the volume of such air.

10. The method of analyzing a gas which consists in supplying the gas in measured quantities at a regular rate, extracting a constituent from the gas, drawing air through an orifice at a rate bearing a known relation to the volume of constituent extracted, and measuring the drop in pressure between the opposite sides of such orifice.

11. The method of analyzing a gas which consists in measuring the volume of the gas extracting a constituent from the gas, introducing air sufficient to make, with the residual gas, a constant quantity and measuring the air thus introduced.

12. The method of analyzing a gas which consists in taking a measured portion of the gas at a regular rate from a passing current of the gas, extracting a constituent continuously from such measured portion, introducing air sufficient to make with such measured portion from which a constituent has been extracted, a constant quantity and measuring the air thus introduced.

13. The method of analyzing a gas which consists in maintaining a constant inflow of measured quantities of the gas at one end of a circuit and a constant outflow at the other end of said circuit, removing from said circuit a constituent of said gas which is to be measured, introducing air into said circuit in sufficient quantity to supply the constant outflow, and measuring said quantity of air.

14. The method of analyzing a gas which consists in maintaining a constant inflow of measured quantities of the gas at one end of a circuit and a constant outflow at the other end of said circuit, removing from said circuit a constituent of said gas which is to be measured, introducing air into said circuit through a small orifice in sufficient quantity to supply the constant outflow, and measuring the drop in pressure between the atmospheric side and the inner side of said orifice.

In witness whereof, I have hereunto signed my name in the presence of two subscribing witnesses.

HENRY C. PARKER.

Witnesses:
MABEL L. JUDD,
ADDESON L. GREEN.